Nov. 5, 1929.　　　　W. C. CHITTY　　　　1,734,419
ELECTRICAL VALVE ACTUATION
Filed Jan. 12, 1927
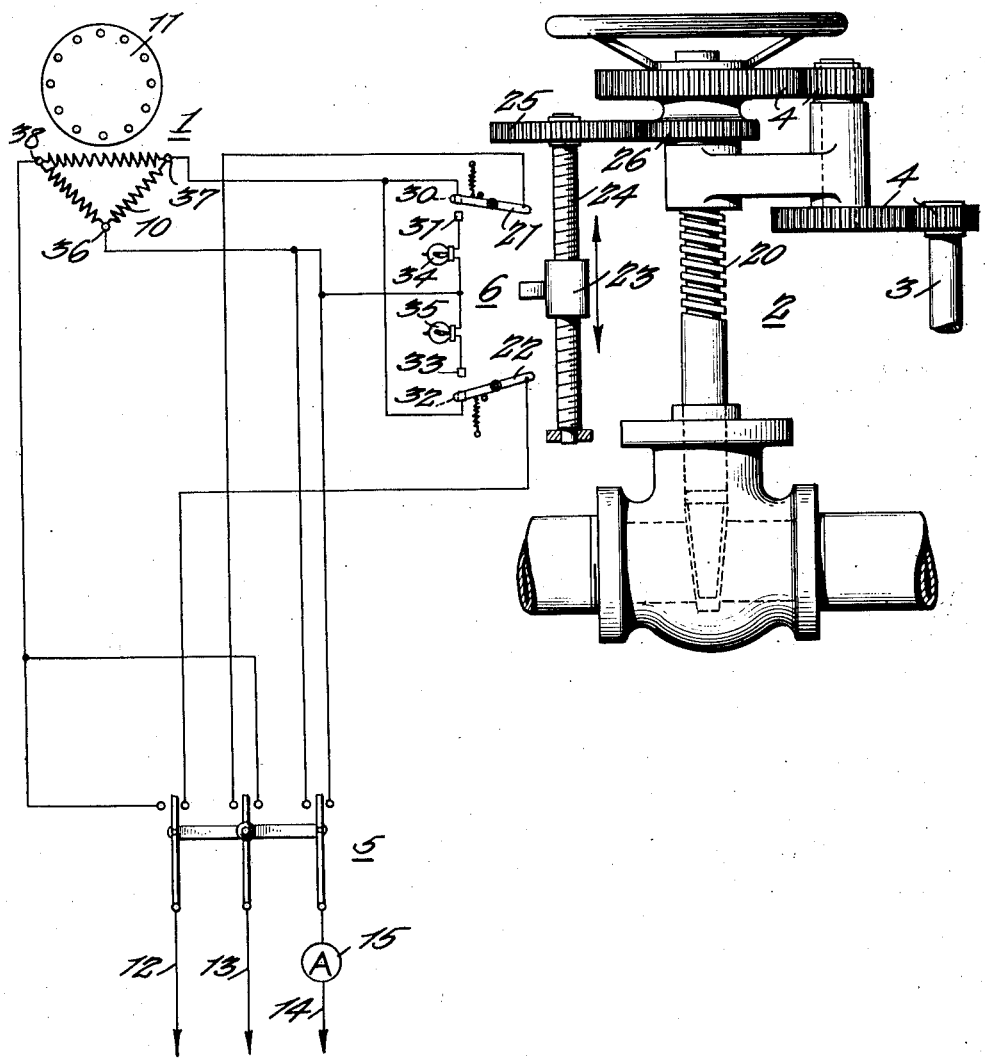
INVENTOR.
W. C. CHITTY,
BY J. F. Brandenburg
ATTORNEY.

Patented Nov. 5, 1929

1,734,419

UNITED STATES PATENT OFFICE

WILLIAM C. CHITTY, OF BAYONNE, NEW JERSEY, ASSIGNOR OF THREE-FOURTHS TO TIDE WATER OIL COMPANY, OF BAYONNE, NEW JERSEY, A CORPORATION OF NEW JERSEY

ELECTRICAL VALVE ACTUATION

Application filed January 12, 1927. Serial No. 160,754.

My invention relates to electrically operated valves for oil, water, steam or other distributing mains and to an improved method of operating such valves.

The underlying principles of my invention may be utilized in other motor-driven mechanisms without departing from the scope of my invention. However, I consider it to be of particular value in valve mechanisms and I shall illustrate and describe such an application of the invention herein.

The object of my invention is to provide a simple and efficient driving mechanism for an element, such as the valve member of a gate valve, which is adapted to open and close the valve positively and reliably without imposing excessive strain upon the motor or valve and which is free from the other difficulties which have attended the use of motors for the operation of valves.

It has been proposed to operate valves by a direct-current or an alternating-current motor in the circuit of which was interposed a limit switch intended to open the motor circuit at the instant the valve reached the open or closed position. This construction has been found unsatisfactory because of the changes in adjustment resulting from wear on the valve elements or driving gears or because of the effect of the formation of incrustations on the valve or the presence of other foreign material. It is, perhaps, unnecessary to point out that a driving mechanism which may permit the disconnection of the motor before the valve is entirely closed or which may fail to disconnect the motor when the valve is closed is entirely unsuitable for ordinary valve applications.

Furthermore, a valve often becomes slightly jammed or packed when closed and the operating motor must have sufficient torque to start the valve member under these conditions. It is, therefore, impossible to use a friction clutch, as has been proposed, between the motor and valve member and adjusted to slip at the maximum torque which can safely be used to close the valve, as this torque may be insufficient to open the valve.

In accordance with my invention, a polyphase alternating-current motor is connected through reduction gearing to the valve. The size of the motor is determined by the size of the valve and is such that the normal torque is sufficient to close the valve properly against its seat without imposing excessive strain thereon and the starting torque is sufficient to re-open the valve. The motor is controlled by a main switch which is manually operated and a limit switch controlled by the motor itself. The main switch has two operative positions, in which the motor is connected to the supply circuit in such a manner as to effect the opening and closing of the valve respectively, and an intermediate or "off" position. The limit switch, instead of opening the motor circuit entirely, is arranged to open one phase thereof before the valve reaches either the fully opened or fully closed position in order to permit the continued operation of the motor as a single-phase motor.

The advantages of this construction, which may be employed in other applications where similar difficulties are encountered, will be pointed out in detail hereinafter. In general, a simple operating mechanism is obtained which insures the proper seating of the valve and the re-opening thereof, and which does not impose an excessive strain upon the motor or valve.

Various auxiliary devices may be employed advantageously in the construction which I have invented. For example, in accordance with a further feature of my invention, a current-responsive device may be connected in the motor circuit to be operated by the change of current which occurs when the valve reaches the fully opened or fully closed position. Signalling devices, such as electrical lamps, may also be arranged to be operated by the limit switch.

For a better understanding of my invention, reference should be had to the accompanying drawing, the single figure of which shows an electrically operated valve embodying my invention. In the drawing, the driving motor and the electrical circuits are shown diagrammatically.

Referring to the drawing, a three-phase electrical induction motor 1 is arranged to operate a gate valve 2 through a drive shaft 3 and reduction gearing 4. The circuit of the motor 1 is controlled by a main switch 5, which is adapted to be operated manually, and a limit switch 6 operated by the motor.

The polyphase induction motor 1 may be of any usual construction, and, as shown, comprises a delta-connected primary winding 10 and a squirrel-cage secondary winding or rotor 11. The terminals of the primary winding 10 are connected through the contact members of the switch 5 to conductors 12, 13 and 14 of the three-phase supply circuit. An ammeter 15 is connected in the conductor 14 adjacent the switch 5.

The valve 2 may be also of the usual construction and, as shown, the stem 20 thereof is threaded at its upper end for cooperation with a threaded portion of one of the gears 4, so that rotation of the gear raises and lowers the valve stem and thereby opens and closes the valve. The detailed construction of the valve forms no part of the present invention and any suitable valve may be employed.

The limit switch 6 comprises two movable contact members 21 and 22 which are engaged by a threaded traveler 23 in the extreme positions of the valve. The traveler 23 is disposed upon a threaded rod 24, which is arranged to be rotated by means of a gear 25 which meshes with a gear 26 integral with or secured to one of the gears 4. The rotation of the threaded rod 24 causes the traveler 23 to move back and forth and, in its extreme positions, to engage the contact members 21 and 22.

The contact member 21 cooperates with two stationary contact members 30 and 31 in its normal and operated positions, respectively. A biasing spring or other suitable means may be provided for retaining the contact member 21 in its normal position. Similar stationary contact members 32 and 33 are arranged to cooperate with the movable contact member 22. The contact members 31 and and 33 are connected to electrical lamps 34 and 35, the other terminals of the lamps being connected to a terminal 36 of the primary winding 10 of the motor. The normal contact members 30 and 32 are connected to a terminal 37 of the primary winding 10 of the motor. The contact members 21 and 22 are so connected to the terminals of the main switch 5 that one is in circuit when the main switch is operated to close the valve and the other is in circuit when the main switch is operated to open the valve.

The third terminal 38 of the winding 10 is also connected to° two contact members of the main switch 5, which are in circuit alternately when the main switch is actuated in one direction or the other.

It will be noted that as the valve 2 approaches either extreme position, one of the contact members 21 or 22 of the limit switch 6 is operated to break the connection from the supply circuit to the terminal 37 of the motor. The operation of the limit switch at the same time connects one of the signal lamps 34 or 35 in circuit. If the driving motor 1 is large, intermediate relays operated by the limit switch may be employed to obviate the necessity of breaking the motor circuit at the contacts of the limit switch.

Assuming that the valve 2 is open and it is desired to close the same, the main switch 5 is actuated to connect the driving motor 1 to the supply circuit. The rotation of the motor lowers the valve stem 20 and thereby closes the valve. As the valve member approaches the closed position one of the contact members of the limit switch, for example, the contact member 21, is actuated by the traveler 23, thereby opening one phase of the motor circuit.

The motor, however, continues to operate as a single-phase motor, as the torque required to operate the valve member is only a small percentage of the pull-out torque of the motor. This single lamp 34 is lighted and serves as an indication that the valve is approaching the closed position. When the valve member reaches its seat, the rotation of the motor stops, and, since a polyphase motor possesses no torque on single-phase excitation, there is no shock or strain imposed upon the valve nor upon the motor.

After the motor has stopped, however, it draws a heavy current from the supply circuit, and the ammeter 15, responsive to this current, indicates to the operator that the valve is closed.

When it is desired to open the valve, the main switch is actuated in the opposite direction, thereby causing the driving motor 1 to rotate in such a direction as to raise the valve stem 20 of the valve. When the valve approaches the fully opened position, the traveler 23 engages the contact member 22 of the limit switch and opens one phase of the motor circuit. The motor continues to operate as a single-phase motor until the valve stem reaches its extreme position, where it may be stopped, for example, by the engagement of the valve member with a portion of the enclosing casing. Excessive strain on the valve or motor is avoided because the motor, which is operating single-phase, possesses no torque after its rotation has ceased. At the same time, the signal lamp 35 is connected in circuit and indicates that the valve is approaching its extreme position.

The contact members 21 and 22 of the limit switch are so arranged as to be operated at a definite distance from the end of the valve travel. In a large valve, for example, each contact might be operated about three seconds before the valve reaches its extreme positions.

Since the final movement of the valve in either direction is effected with the driving motor operating single-phase, the motor will exert no torque upon the valve member after the valve is entirely seated or completely opened and the rotation of the motor has ceased. Until the valve has reached its extreme position, however, the motor will exert ample torque to secure a positive and reliable operation of the valve. In starting to open the valve, the driving motor will start as a three-phase motor and will exert a much larger torque than was available for closing the valve. Consequently there will be no tendency for a valve to stick or be jammed in the closed position.

The ordinary three-phase induction motor is well adapted for this application, as it develops a starting torque of about three times the full load torque and the actual torque required to operate the valve when running is only about 15–30% of full load torque. The pull-out torque of the motor operating single-phase is about 110% of the normal full-load torque.

It will be apparent that the construction which I have described satisfies the rather stringent requirements encountered in the operation of a valve. The mechanical construction is very simple, however, and the position of the limit switches do not require careful adjustment. The electrical circuits of the motor are simple, inasmuch as only one phase of the motor circuit is opened.

It will be apparent that the structural details of the valve and motor, and the arrangement of the electrical circuits illustrated and described may be considerably varied.

I claim:

1. A valve comprising a valve member, a valve seat, a polyphase electrical motor arranged to drive the valve member towards the seat, said motor operating under polyhase excitation during the major portion of the operating cycle, and means for so controlling the circuit of the motor that the valve member is driven at a certain point of its travel with the motor operating under single-phase excitation.

2. A valve comprising a valve member, a valve seat, a polyphase electrical motor, arranged to drive the valve member towards the seat, said motor operating under polyphase excitation during the major portion of the operating cycle, and means for so controlling the circuit of the motor that the valve member is seated with the motor operating under single-phase excitation.

3. A valve comprising a valve member, a valve seat, a polyphase electrical motor, arranged to drive the valve member towards the seat, said motor operating under polyphase excitation during the major portion of the operating cycle, and means including a limit switch operated by the motor for so controlling the motor circuit that the valve member is seated with the motor operating under single-phase excitation.

4. A valve comprising a valve member, a valve seat, a polyphase electrical motor arranged to drive the valve member towards and away from its seat, said motor operating under polyphase excitation during the major portion of the operating cycle, and means including a limit switch operated when the valve member reaches a predetermined position for effecting a continued operation of the motor under single-phase excitation.

5. The method of closing a valve member against its seat which comprises operating a polyphase driving motor under polyphase excitation during the major portion of the operating cycle and under single-phase excitation during the final movement of the valve member.

6. The method of operating a valve which comprises operating a polyphase driving motor under polyphase excitation during the major portion of the operating cycle and under single-phase excitation as the valve approaches the opened and closed positions.

7. In combination, a polyphase electrical motor, an element driven thereby through the major portion of an operating cycle with the motor under polyphase excitation and means for opening one phase of the motor circuit when the element reaches a predetermined position to effect the continued operation of the motor under single-phase excitation.

W. C. CHITTY.